L. F. MORSE.
COPYING APPARATUS.
APPLICATION FILED JAN. 6, 1921.

1,420,491.

Patented June 20, 1922.

WITNESSES

INVENTOR
LOUIS F. MORSE.
BY
ATTORNEYS

UNITED STATES PATENT OFFICE.

LOUIS F. MORSE, OF BROOKLYN, NEW YORK.

COPYING APPARATUS.

1,420,491.      Specification of Letters Patent.    Patented June 20, 1922.

Application filed January 6, 1921. Serial No. 435,492.

*To all whom it may concern:*

Be it known that I, LOUIS F. MORSE, a citizen of the United States, and resident of the city of New York, borough of Brooklyn, in the county of Kings and State of New York, have invented a new and Improved Copying Apparatus, of which the following is a full, clear, and exact description.

It is well appreciated that numerous devices have been placed upon the market with a view of providing means for the copying of pictures on a plain sheet. These devices have, for the most part, presented several objections in that they were primarily more or less complicated in structure, and necessitated the manipulation of quite a few parts to permit of the copying being effected.

Further copying devices relating more particularly to the class in which my apparatus falls have also been placed upon the market, and these devices overcame the difficulties incident to complication of structure, and expense, in that they presented a transparent reflecting surface which was arranged at an angle to the surface adapted to receive a picture or similar device to be copied, and also at an angle to a surface adapted to receive a copied picture.

These devices were operated by arranging the parts in the manner specified, subsequent to which an operator would observe the reflected image of the picture to be copied in the surface provided for this purpose, and by placing his hand below this element could by virtue of the transparent interior of the same, follow the lines of the picture, by reason of the transparency of the surface in which the same is reflected.

This latter class of device has further been incapable of being manipulated to provide an extremely compact article, capable of ready transportation, as well as failing to provide any structure permitting of the copy receiving surface being properly shaded, and the angle of the picture and transparent reflecting surface being varied to accomplish the best distribution of the light rays.

With this in view, I have constructed a copying device which shall primarily be extremely simple in construction, and capable of having its parts connected to provide an extremely compact element. By this, an article is provided which may be manufactured at a low figure, aside from the fact that the same lends itself to ready transportation.

A further object of my invention is the provision of a copying device in which the various surfaces may be manipulated to obtain a maximum benefit distribution of the light rays, so that the image will be reflected in the surface provided for this purpose, to the best advantage, and aside from the fact that the copy receiving surface may be disposed with a maximum of transparency without interfering with the reflection aforedescribed, so that an operator may be capable of quickly tracing the picture or other device to be copied.

Further objects of my invention will appear in the annexed specification and drawings, which present practical embodiments of my invention, and in which—

Figure 1:
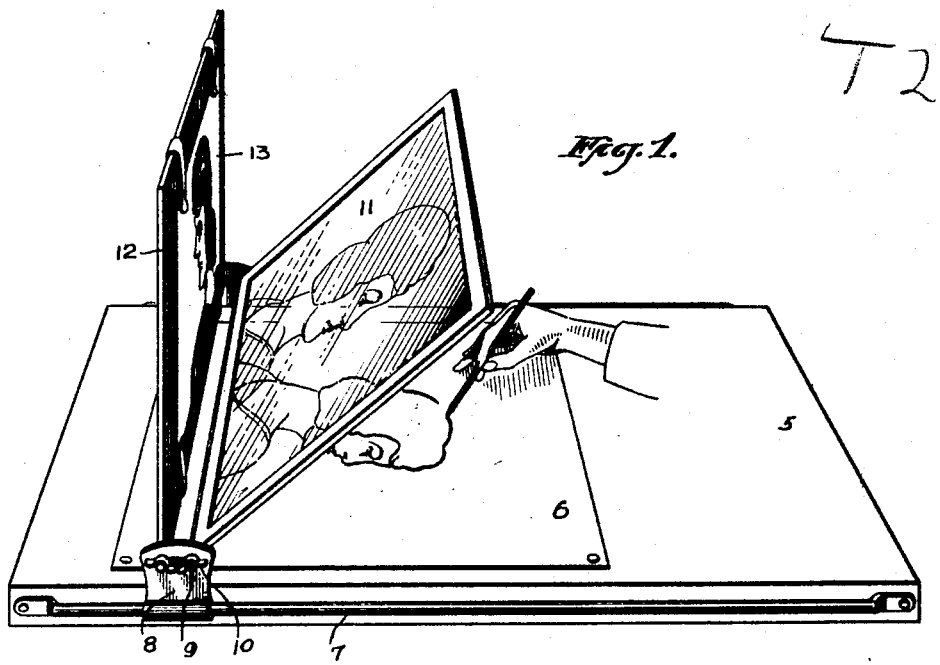
Figure 1 is a perspective view of one form of device constructed in accordance with my invention.

Referring now more particularly to Figure 1 it will be seen that the reference numeral 5 indicates the base portion of the device which is adapted to receive the paper or other elements 6, which is to have the picture copied upon its face, and this paper may be secured in any suitable manner to the base 5.

Slidably mounted, as upon rails 7 are brackets 8 which carry the ends of rods 9 extending transversely over the space from the upper face of the base 5.

In this connection it is to be noted that the rods 9 may be secured to prevent them from rotating, by any suitable means such as thumb screws 10, cooperating with the brackets 8, and by this means a transparent glass, which is attached to one of the rods 9, may be retained at any desired angle. Also a board or backing sheet 12, secured to the second of these rods, may be manipulated in a similar manner.

Figure 2:
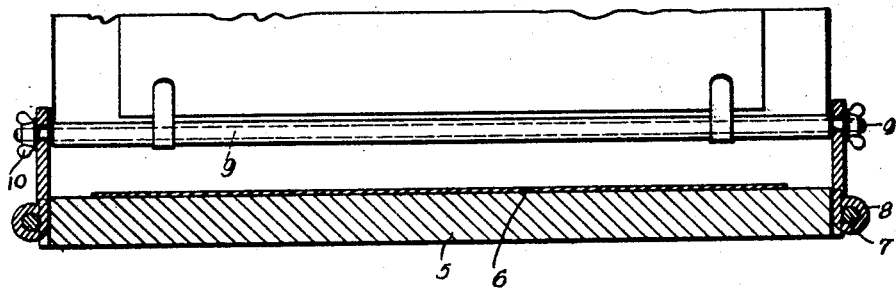
Figure 2 is an enlarged sectional view taken through the same.

It will thus be noted that I have provided, in the structure illustrated in Figures 1 and 2, a copying apparatus, primarily including a base with which a plain sheet may be associated, at any desired point in its outer surface. The print or other element 13 to be copied may be affixed by any suitable means to the backing board 12, and the angularity of the latter adjusted to a point at which a maximum of light rays will fall upon the surface of the same. Thus the maximum of reflection will be obtained in the element 11 and by a manipulation of the latter with regards to angularity, the same may be moved to a point at which the highest point of transparency may be achieved without lessening the reflecting value of this element.

By this expedient, it will be appreciated that I have provided a device of the character specified, in which the defects incident to copying will be reduced to a minimum, and it will be appreciated that by virtue of the rails 7 and brackets 8 slidably mounted upon these members that the e'ement 11 and the backing board 12 may be moved to any desired point to centralize the reflection with respect to the sheet 6.

Figure 3:
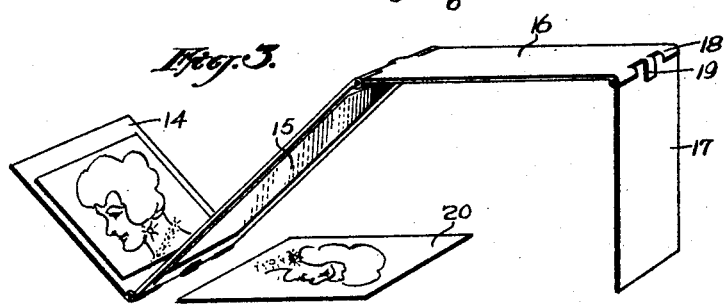
Figure 3 is a perspective view of another form of device embodying my improved construction.

With a view of providing an article which shall be capable of being manufactured at an extremely low figure, and which shall present in certain respects, superior points over the device illustrated in Figure 1, reference is had to Figure 3 in which it will be noted that I have provided an element preferably including four surfaces, 14, 15, 16 and 17 all of which are hingedly secured together, as has been indicated by the reference numeral 18, and which may be formed with stop elements 19 serving to limit the swinging motion of one of these members with respect to the other.

Obviously the entire device illustrated in this figure may be folded into an extremely compact mass lending itself to ready transportation, and it will further be appreciated that the surface 14 will act as a receiving element similar to the backing sheet 12 illustrated in Figures 1 and 2, and that the surface 15 includes a transparent reflecting portion serving to reflect any article positioned upon the surface 14, and at the same time permitting of the viewing of the sheet 20 arranged below the surface 15.

The surfaces 16 and 17 serve to properly support the surfaces 14 and 15, aside from the fact that they act as a shade guarding against too many light rays striking upon the sheet 20.

From the foregoing it will be appreciated in both of my devices, that I have provided a copying apparatus of great utility, which may be manufactured at an extremely low figure, and in which the parts of the same may be manipulated to insure the most perfect results in copying, aside from the fact that obviously numerous modifications of structure might readily be resorted to without in the least departing from the spirit of my invention, which I claim as;

A copying apparatus including a pair of translucent elements, a transparent element, and a receiving element, hinges adjacent the end edges of said elements for swingingly connecting the same one to the other, and stops associated with said elements and adjacent their point of hinged connection, said stops co-operating with said elements in such a manner as to permit of said translucent elements being arranged at right angles with respect to each other so that the same might be disposed upon a supporting surface to provide a part shaded from light rays, said transparent element being disposed in an inclined plane with respect to one of said translucent elements and being adapted to over lie the shaded portion of said supporting surface said receiving element being disposed at an angle to and forming a continuation of said transparent element.

LOUIS F. MORSE.